United States Patent [19]

Harman

[11] 4,235,137
[45] Nov. 25, 1980

[54] TUBE CUTTER

[75] Inventor: Galen B. Harman, La Grange, Ind.

[73] Assignee: Burr Oak Tool & Gauge Company, Sturgis, Mich.

[21] Appl. No.: 968,289

[22] Filed: Dec. 11, 1978

[51] Int. Cl.³ .............................................. B23B 5/14
[52] U.S. Cl. ......................................... 82/73; 82/71
[58] Field of Search .................. 82/71, 73, 62, 63, 64, 82/76

[56] References Cited

U.S. PATENT DOCUMENTS

| | | | |
|---|---|---|---|
| 1,166,456 | 1/1916 | Hamer | 82/71 |
| 2,562,879 | 8/1951 | Abbey | 82/71 |
| 2,619,174 | 11/1952 | Neale | 82/71 |
| 2,894,582 | 7/1959 | Long | 82/71 |
| 3,772,945 | 11/1973 | Varga | 82/73 |

Primary Examiner—Leonidas Vlachos

Attorney, Agent, or Firm—Blanchard, Flynn, Thiel, Boutell & Tanis

[57] ABSTRACT

A tube cutoff device which includes a rotatable cutter head assembly for radially slidably supporting a cutter and a pair of support rollers in circumferentially spaced relationship. A stationary tubular guide extends through the cutter head assembly for permitting a tube to be fed therethrough and positioned between the cutter and the support rollers. A cam assembly is rotatable with and axially slidably supported on the cutter head assembly. When the cam assembly is axially displaced, it cooperates with the cutter and rollers for displacing same radially inwardly into engagement with the tube which is to be cut. The cam assembly is axially activated by a nonrotatable actuator which is axially movable and coupled to the cam assembly. The actuator is coaxially aligned with the cutter head assembly and is positioned concentrically around the tubular guide.

9 Claims, 3 Drawing Figures

TUBE CUTTER

FIELD OF THE INVENTION

This invention relates to a device for cutting tubing and, in particular, to an improved cutoff device of the type employing guide means for directing a tube along a selected axis, and cutter means rotatable about the guide means.

BACKGROUND OF THE INVENTION

U.S. Pat. No 4,112,794, owned by the Assignee of this application, discloses therein a tube cutoff device employing a cutoff assembly which is concentric with and rotates around a stationarily supported tube to permit cutting thereof into selected lengths. The rotatable cutoff assembly includes three contact members which are equally angularly spaced around the tube, two of the members being support rollers and the third being a cutter. The cutoff device of this general type is well known and has proven highly desirable for use in cutting tubes into selected lengths. The device disclosed in the above-mentioned patent, however, employs a rotatable cam for effecting relative rotation between the cutoff head and the tube, with the cam being controlled by a phase-change mechanism. While this prior apparatus is extremely desirable for high production rates and for handling different diameter tubes, nevertheless numerous applications require the utilization of a tube cutoff device of a simpler and more compact nature.

U.S. Pat. No. 3,772,945, issued to Varga, also discloses a tube cutoff device employing a rotatable cutter head of the same general type described above. The device of Varga is of a simpler nature, however, in that it is designed for cooperation primarily with a stationarily supported tube, with the cutter head rotating therearound and the cutter being cammed radially inwardly to engage and hence cut the tube. The cutter head of Varga is conventional and operates in a desirable manner. However, the overall device of Varga has exhibited structural and operational characteristics which are believed less than optimum. For example, the Varga device actuates the cutter and rollers by means of an axially slidable cam, which cam is controlled by a rotatable collar having a follower groove therein for confining a cam roller associated with an axially reciprocal slide. This structure, due to the continued high speed rotation between the rotatable collar and the axially shiftable slide, causes excessive wear. This structure is also more subject to binding due to the structural and functional relationships which exist between the cooperating components of the activating linkage.

The present invention thus relates to an improved tube cutoff device which overcomes the above-mentioned disadvantages, and which is believed to provide a more optimum and compact structure for use in cutting a stationary tube into selected lengths, which device is able to accomplish the cutting operation simply and efficiently while permitting accurate yet simple control over the radially movable cutter.

Other objects and purposes of the invention will be apparent to persons familiar with devices of this general type upon reading the following specification and inspecting the accompanying drawings.

Figure 1:
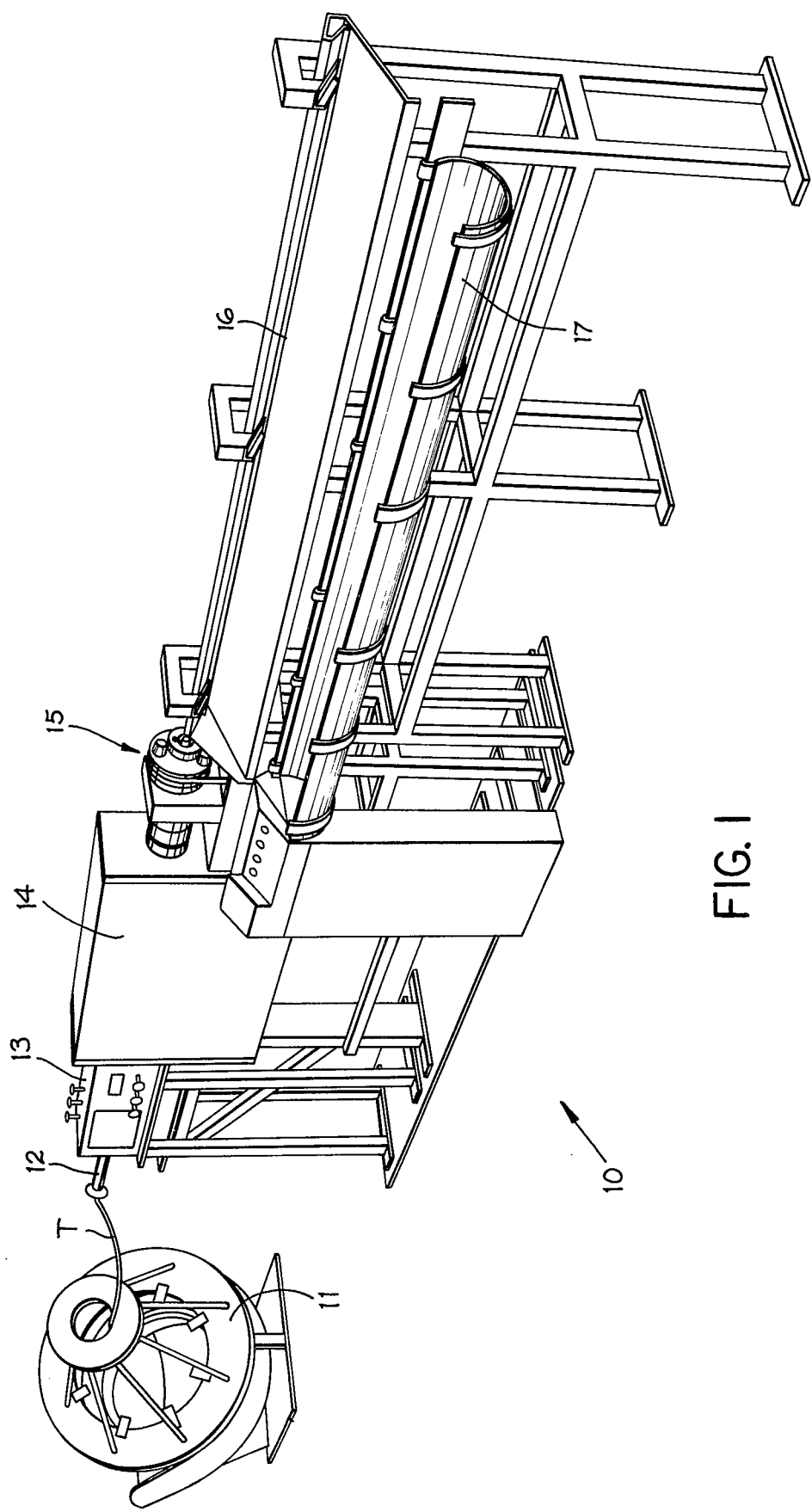
FIG. 1 is a perspective view of an overall tube cutting apparatus incorporating therein the improved cutoff device of the present invention.

Certain terminology will be used in the following description for convenience in reference only and will not be limiting. For example, the words "upwardly", "downwardly", "leftwardly" and "rightwardly" will refer to directions in the drawings to which reference is made. The word "forwardly" will refer to the advancing directions of the tube through the device, which direction is rightwardly in FIG. 2. The words "inwardly" and "outwardly" will refer to directions toward and away from, respectively, the geometric center of the device and designated parts thereof. Said terminology will include the words specifically mentioned, derivatives thereof and words of similar import.

DETAILED DESCRIPTION

FIG. 1 illustrates therein an overall apparatus 10 for handling and cutting an elongated tube T into preselected lengths. This apparatus includes a spiral payoff stand 11 which stores the continuous tube in a substantially coiled form and supplies same through a guide 12 to a two-plane straightener 13. This is followed by a feed device 14 which supplies the tube to a cutoff device 15 according to the present invention. This device is followed by a runout table 16 which supports and removes the cut segment of the tube, with the cut segment being deposited in an adjacent collecting through 17. A control panel 18 is also provided for controlling the operation of the overall apparatus.

The overall apparatus 10, as described above, is of substantially conventional construction and operation. Thus, only the improved tube cutoff device 15 will be described in detail.

Figure 2:
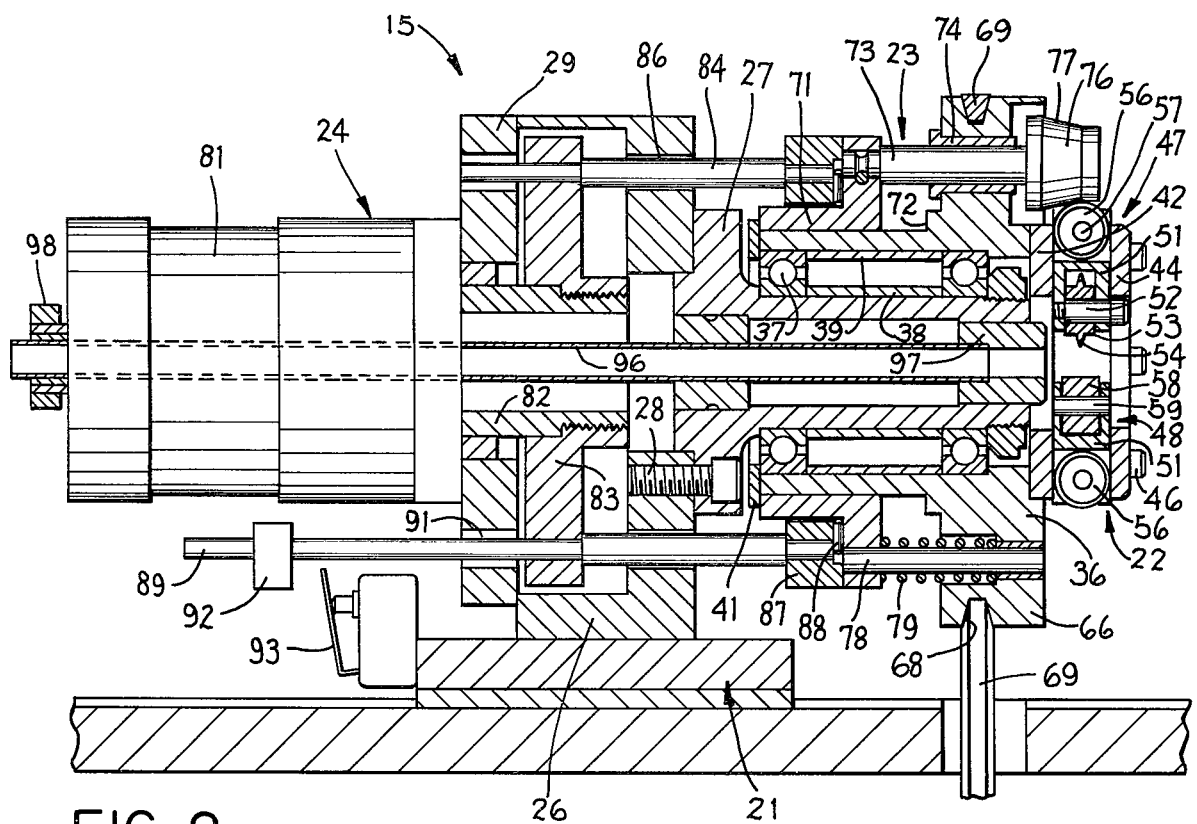
FIG. 2 is a fragmentary longitudinal sectional view of the improved tube cutoff device, same being taken substantially along line II—II in FIG. 3.
Figure 3:
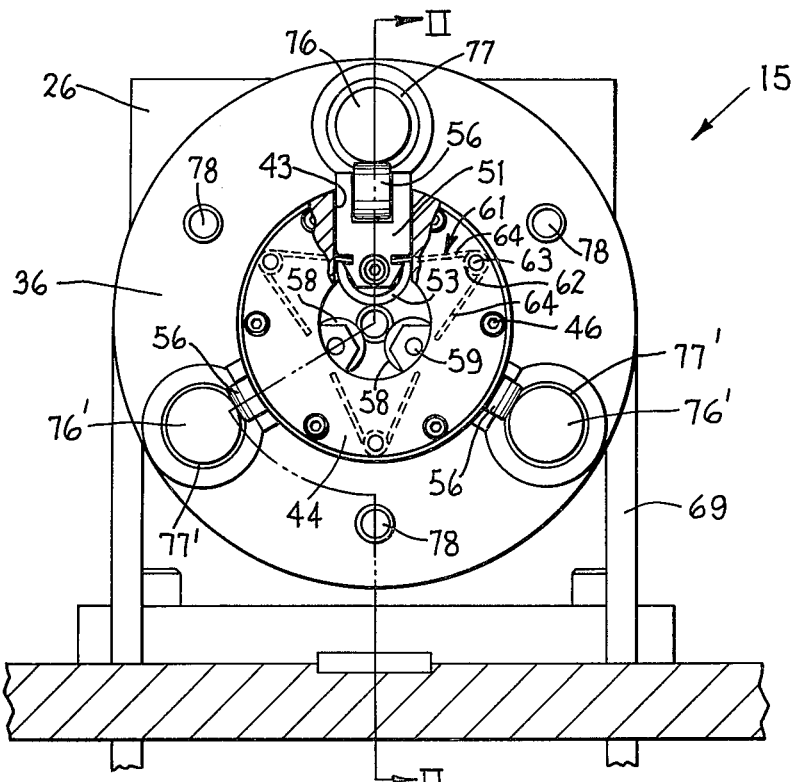
FIG. 3 is a front view of the tube cutoff device, substantially as appearing from the right side of FIG. 2.

The tube cutoff device 15, as illustrated in FIGS. 2 and 3, includes a stationary support structure 21 having a rotatable cutter head assembly 22 supported thereon. This cutter head assembly 22 in turn is activated by a cam-type actuator 23 which is reciprocated by a drive means 24.

The support structure 21 includes a support block 26 which is stationarily mounted relative to the frame of the tube cutting apparatus, and which has a sleevelike spindle 27 fixed thereof, as by screws 28, so that the spindle has the axis thereof projecting substantially horizontally. A mounting plate 29 is fixed to the support block 26 adjacent the end thereof opposite the spindle.

Considering now the cutter head assembly 22, same includes a rotatable sleevelike body 36 positioned in concentric relationship to the spindle 27 and rotatably supported thereon by conventional anti-friction bearings 37, which bearings are axially spaced apart by inner and outer spacers 38 and 39, respectively. The rotatable body 36 has a ringlike stop plate 41 fixed to the rearward (leftward) end thereof.

The forward (rightward) end of the rotatable body 36 has a ring-shaped support plate 42 fixedly secured thereto, which plate in the front face thereof is provided with three grooves 43 which extend radially between the inner and outer peripheries thereof, which grooves are equally angularly spaced apart. The outer face of these grooves is closed by a suitable ring-shaped retainer plate 44. Conventional threaded fasteners 46 fixedly connect the retainer plate 44, the support 42 and the rotatable body 36 together so as to form a unitary rotatable structure.

The three grooves 43 respectively slidably support therein three tube contact units 47, 48 and 49, which contact units are movable radially toward or away from the axis of the rotatable body 36, which axis is also aligned with the axis of the tube T.

The tube contact unit 47 includes a blocklike carrier 51 which is radially slidably supported within the groove 43. This carrier 51, at its radially inner end, is provided with a pair of inwardly projecting legs which define therebetween a slot, in which slot is positioned a rotatable annular cutter 53, same being rotatably supported on a support axle 52. This annular cutter 53, which is of a conventional construction, has a surrounding annular bladelike cutting edge 54 for severing or cutting the tube T. The cutter 53 is thus rotatably supported about an axis which extends parallel with the axis of the tube T.

The outer end of carrier 51 associated with tube contact unit 47 has a further pair of parallel legs which project outwardly and are spaced apart so as to define a slot therebetween. This slot, which extends in the axial direction of the cutoff device, has a roller-type cam follower 56 positioned therein, which cam follower is rotatably supported on a pin 57 which is supported on the carrier 51. The cam follower 56 is positioned so that it projects outwardly beyond the radially outer end of the respective groove 43.

The tube contact unit 48 is substantially identical to the contact unit 47 in that it again includes a carriage 51 slidably supported within one of the radial grooves 43, which carrier has a roller-type cam follower 56 at the outer ends thereof. The tube contact unit 48, however, is not provided with an annular cutter 53, but rather is provided with a support roller 58 on the radially inner end of the carrier, which support roller is rotatably supported on a support pin 59 which extends parallel to the axis of the cutoff device.

The other tube contact unit 49 is identical to the unit 48 described above.

A V-shaped leaf spring 61 coacts between each adjacent pair of carriers 51 to resiliently urge them radially outwardly. The spring 61 has a coil portion 62 at the apex thereof which is mounted on a stationary pin 63. The legs 64 of the spring engage the carriers 51.

The cutter head assembly 22 is rotatably driven from a suitable power source (not shown) associated with the apparatus, which power source drives a conventional endless drive belt 69, which drive belt is disposed in engagement with an annular pulley groove 68 which is formed in and externally surrounds the flange portion 66 of the support body 36.

The tube contact units 47-49 are radially inwardly displaced by the cam-type actuator 23 which includes a slide ring 71 concentric with and axially slidably supported on the support body 36. The slide ring 71 is axially displaceable between the stop ring 41 and an opposed shoulder 72 formed on the support body. The slide ring 71 has a plurality, here three, of parallel slide rods 73 fixed thereto and projecting axially forwardly therefrom. These slide rods 73 are equally angularly spaced apart and slidably extend through the flange 66, being supported on suitable bushings 74. The front ends of the slide rods 73, which are individually positioned adjacent the outer ends of the radial grooves 43, are each provided with a cylindrical cam 76 or 76' secured thereto, which cams are aligned with the slide rods 73.

The cam 76, as associated with the cutter unit 47, has a conical profile 77 which increases in diameter from the front to the rearward end thereof so as to effect radially inward camming of the cutter unit.

The cam 76' as associated with each roller unit 48 and 49 is similar to the cam 76 except that the conical cam profile 77' on cam 76' is of substantially shorter axial length, although of the same slope. This cam profile 77' terminates in a cylindrical support surface. The cams 76' cause the rollers 58 to be moved into engagement with the periphery of the tube T and then held in engagement therewith to support the tube, whereas the cam 76 causes the annular cutter 53 to be moved radially inwardly to not only engage the periphery of the tube T, but to also cause the cam to be moved further radially inwardly so that the cutting edge 54 thereof radially penetrates the wall of the tube.

The cam-type actuator 23 is normally maintained in its retracted, that is its leftwardmost, position wherein the slide ring 71 abuts the stop plate 41. For this purpose, the slide ring 71 has a plurality, here three, of guide rods 78 fixed thereto and projecting axially forwardly therefrom, which guide rods have the forward ends thereof slidably supported within bushings mounted on the support body 36. Conventional compression springs 79 are disposed in surrounding relationship to the guide rods 78 and react therebetween, whereby the slide ring 71 is urged axially rearwardly so as to be normally maintained in abutting engagement with the stop plate 41. In this position, the cams 76 and 76' are also axially retracted so that the tube contact units 47-49 are maintained in their radially outermost positions due to the urging of springs 61, and due also to the effect of centrifugal force inasmuch as the support body 36 is normally continuously rotated at a high rotational speed.

The cam-type actuator 23 is axially advanced by the drive means 24 which, as illustrated in FIG. 2, includes a conventional fluid pressure cylinder 81. This cylinder has the housing thereof fixedly secured to the mounting plate 29, and the reciprocal annular piston rod 82 slidably projects outwardly from the front end (rightward end) of the housing and has an annular pressure ring 83 fixedly secured thereto. A plurality, here three, of push rods 84 are fixed to the pressure ring 83 in equally angularly spaced relationship, which push rods project axially forwardly of the pressure ring and slidably extend through suitable bushings 86 as mounted on the support block 26. The forward ends of these push rods 84 are fixedly secured to a nonrotatable thrust ring 87 which is positioned in surrounding relationship to the slide ring 71. This thrust ring 87 bears against the flange on the slide ring 71 through an intermediate anti-friction thrust bearing 88.

An actuator rod 89 projects axially rearwardly from the pressure ring 83, which actuator rod is integral with one of the push rods 84 and is slidably supported within a bushing 91 mounted on the mounting plate 29. This actuator rod 89 has a suitable lug 92 thereon positioned for actuating a conventional adjustably-mounted limit switch 93 when the pressure ring 83 and the cams 76—76' are in their advanced (that is, their rightwardmost) position. Activation of limit switch 93 causes activation of a suitable valve which controls the flow of pressure fluid to cylinder 81 so as to permit the retraction of the internal piston associated therewith.

To guide the tube T, there is provided an elongated tubular guide 96 extending axially throughout substantially the complete length of the device. This guide 96 extends axially through the pressure cylinder 81 and through the main spindle 27, being stationarily supported therein by bushings 97. The forward free end of the tubular guide 96 thus terminates closely adjacent the tube contact units 47–49.

The rearward (leftward) end of the piston rod 82 projects outwardly from the rearward end of the cylinder housing, and has an adjustable stop nut 98 fixedly positioned thereon.

To permit holding of the tube T during cutting thereof, there is additionally provided a conventional clamping structure (not shown) disposed closely adjacent and slightly downstream of the cutoff device, which clamping unit includes a pair of opposed and relatively movable clamping jaws adapted to clampingly grip the tube therebetween during the cutting operation. This is conventional on apparatus of this general type, so that a further detailed description thereof is not believed necesssary.

OPERATION

A length of tube T is withdrawn from the payoff stand 11 and sent through the two-plane straightener 13 and is then advanced into and through the tubular guide 96 associated with the cutoff device 15, with the tube being advanced sufficiently through the cutoff device into the runout table 16 such that the desired length of tube is disposed forwardly of the cutoff device. During this advancing of the tube, the cutter head assembly 22 is continuously rotated at a high rotational speed so that the tube contact units 47–49 are thus maintained, due to springs 71 and due to centrifugal force, in their radially outermost positions wherein the rollers 56 are engaged with the cams 76 and 76'.

The pressure cylinder 81 is then energized to axially advance (rightwardly in FIG. 2) the piston rod 82 and pressure ring 83, which through the thrust ring 87 pushes the rotating slide ring 71 forwardly simultaneous with the continued rotation thereof. This thus axially advances the cams 76 and 76' so that the conical profiles thereon, due to their engagement with the rollers 56, cause the tube contact units 47–49 to be moved radially inwardly for engaging the tube T. The initial axial advance of the slide ring 71, through the action of the cams 76 and 76', causes all of the contact units 47–49 to be radially forced inwardly until the two rollers 58 supportingly engage the tube at two angularly spaced locations. At this point, the rollers 56 associated with the units 48 and 49 have travelled up the full cam slope 77', so that further axial displacement of the cams 76' causes no further inward radial displacement of the units 48 and 49. Also, the cutting edge 54 on the cutter 53 has been radially inwardly displaced sufficiently to contact the tube T. Continued axial displacement of the cams 76 and 76', due to the axially longer profile 77 on the cam 76, then causes the cutter 53 to be gradually moved radially inwardly to a greater extent, during which time the annular cutting edge 54 is progressively forced radially inwardly so as to penetrate and hence cut the wall of the tube due to the continuous rotation or orbiting of the cutter about the stationary tube T.

When the cutting operation has been completed, the slide ring 71 has advanced into a position adjacent the shoulder 72. Simultaneously, the lug 92 contacts the limit switch 93 and activates same, and stop 98 abuts the end of the cylinder housing. This thus terminates the forward pressurization of the pressure cylinder 81, and also simultaneously controls the fluid pressure circuitry associated therewith so as to permit the pressure fluid to be released from the cylinder, following which the cylinder is then axially retracted (leftwardly in FIG. 1). The cam-type actuator 23 is likewise axially retracted due to the urging of the springs 79. During this axial retraction of the cam actuator, the tube contact units 47–49 move radially outwardly so as to follow the cam profile on the rollers 76 and 77 due to the combined urging of centrifugal force and springs 71.

When the cutoff device has returned to its original position, then the tube T as supplied from the payoff stand 11 is again advanced through the overall apparatus and through the tubular guide 96 until the desired length has been fed forwardly of the cutoff device, following which a new cutting operation is then initiated in the same manner as above described.

While the illustrated embodiment discloses the use of one cutter unit and two support roller units, it will be obvious that all cutter units can be used if desired.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an apparatus for cutting a tubular element, said apparatus having a frame, an elongated tubular guide for stationarily supporting the tubular element, and a rotatable cutting head assembly positioned in concentric and surrounding relationship to said tubular guide and rotatable about the axis thereof for permitting cutting of said tubular element, said cutting head assembly including rotatable support means having carrier means movably mounted thereon for radial movement toward and away from the tubular element, said cutting head assembly also including a cutting element mounted on said carrier means for effecting cutting of the tubular element upon radial inward movement of said carrier means during rotation of said support means, cam-type actuator means for effecting inward radial movement of said carrier means, and drive means for movably controlling said actuator means, comprising the improvement wherein said support means includes an elongated sleevelike support structure positioned concentric to said axis and rotatable thereabout, said carrier means with said cutting element mounted thereon being radially movably supported on said support structure adjacent one axial end thereof, said cam-type actuator means including a slide ring externally surrounding said sleevelike support structure and being nonrotatably coupled thereto, said slide ring being axially slidably supported on said sleevelike structure and having cam means mounted thereon and positioned for engaging and radially displacing said carrier means in response to axial displacement of said slide ring, said slide ring being disposed more closely adjacent the other axial end of said sleevelike support structure, and said drive means including a nonrotatable thrust ring disposed in axial bearing engagement with said slide ring for permitting relative rotation therebetween, said thrust ring being axially slidably supported relative to said axis, said drive means also including fluid pressure cylinder means drivingly interconnected to said thrust ring for effecting axial displacement thereof to also cause a corresponding axial displacement of the rotatable slide ring so that said cam means effects radial inward displacement of said carrier means and said cutting element during the rotation of said cutting head assembly, said sleevelike support structure including a radially outwardly projecting portion disposed axially between said carrier means and said slide ring, said projecting portion having opening means extending axially therethrough, said cam means including an elongated element fixedly secured at one end thereof to said slide ring and projecting axially thereof and slidably projecting through said opening means and having a wedgelike cam mounted on the other end thereof adjacent said carrier means.

2. In an apparatus for cutting a tubular element, said apparatus having a frame, an elongated tubular guide for stationarily supporting the tubular element, and a rotatable cutting head assembly positioned in concentric and surrounding relationship to said tubular guide and rotatable about the axis thereof for permitting cutting of said tubular element, said cutting head assembly including rotatable support means having carrier means movably mounted thereon for radial movement toward and away from the tubular element, said cutting head assembly also including a cutting element mounted on said carrier means for effecting cutting of the tubular element upon radial inward movement of said carrier means during rotation of said support means, cam-type actuator means for effecting inward radial movement of said carrier means, and drive means for movably controlling said actuator means, comprising the improvement wherein said support means includes an elongated sleevelike support structure positioned concentric to said axis and rotatable thereabout, said carrier means with said cutting element mounted thereon being radially movably supported on said support structure adjacent one axial end thereof, said cam-type actuator means including a slide ring externally surrounding said sleevelike support structure and being nonrotatably coupled thereto, said slide ring being axially slidably supported on said sleevelike structure and having cam means mounted thereon and positioned for engaging and radially displacing said carrier means in response to axial displacement of said slide ring, said slide ring being disposed more closely adjacent the other axial end of said sleevelike support structure, said drive means including a nonrotatable thrust ring disposed in axial bearing engagement with said slide ring for permitting relative rotation therebetween, said thrust ring being axially slidably supported relative to said axis, said drive means also including fluid pressure cylinder means drivingly interconnected to said thrust ring for effecting axial displacement thereof to also cause a corresponding axial displacement of the rotatable slide ring so that said cam means effects radial inward displacement of said carrier means and said cutting element during the rotation of said cutting head assembly, said sleevelike support structure including a radially outwardly projecting annular flange disposed axially between said carrier means and said slide ring, said flange having at least one opening extending axially therethrough, said cam means including an elongated element fixedly secured at one end thereof to said slide ring and projecting axially thereof and slidably projecting through said opening and having a wedgelike cam mounted on the other end thereof adjacent said carrier means, and rotatable driving means drivingly connected to said sleevelike support structure for effecting rotation thereof, said rotatable driving means including an annular means associated with said annular flange and disposed in driving engagement with a driving element.

3. An apparatus according to claim 2, wherein said support means has at least three said carrier means radially movably supported thereon in substantially equally angularly spaced relationship therearound, each of said carrier means having a freely rotatable roller supported thereon and disposed for engagement with the tubular element when the respective carrier means is radially inwardly displaced, at least one of said rollers comprising said cutting element, said cam means including at least three said wedgelike cams positioned adjacent the side of said annular flange opposite said slide ring so that each of said cams is disposed for radially inwardly camming a respective one of said carrier means, each of said cams being fixedly connected to said slide ring by a similar elongated element which extends axially between the respective cam and said slide ring and axially slidably extends through said annular flange, each of said cams comprising a cylindrical element having a conical external profile over at least a portion of the axial length thereof.

4. An apparatus according to claim 2, wherein said fluid pressure cylinder means is coaxially aligned with said axis and is positioned adjacent but axially spaced from the other axial end of said sleevelike support structure, said tubular guide extending coaxially through said fluid pressure cylinder means and through the piston rod means thereof which projects axially from one end of said fluid pressure cylinder means, said piston rod means being rigidly interconnected to said thrust ring.

5. An apparatus according to claim 4, wherein said support means has at least three said carrier means radially movably supported thereon in substantially equally angularly spaced relationship therearound, each of said carrier means having a freely rotatable roller supported thereon and disposed for engagement with the tubular element when the respective carrier means is radially inwardly displaced, at least one of said rollers comprising said cutting element, said cam means including at least three said wedgelike cams positioned adjacent the side of said annular flange opposite said slide ring so that each of said cams is disposed for radially inwardly camming a respective one of said carrier means, each of said cams being fixedly connected to said slide ring by a similar elongated element which extends axially between the respective cam and said slide ring and axially slidably extends through said annular flange, each of said cams comprising a cylindrical element having a conical external profile over at least a portion of the axial length thereof.

6. An apparatus according to claim 2, wherein said annular means extends externally around said annular flange, and wherein said driving element comprises an endless driving member disposed in external driving engagement with said annular means.

7. In an apparatus for cutting a tubular element, said apparatus having a frame, an elongated tubular guide for stationarily supporting the tubular element, and a rotatable cutting head assembly positioned in concentric and surrounding relationship to said tubular guide and rotatable about the axis thereof for permitting cutting of said tubular element, said cutting head assembly including rotatable support means having carrier means movably mounted thereon for radial movement toward and away from the tubular element, said cutting head assembly also including a cutting element mounted on said carrier means for effecting cutting of the tubular element upon radial inward movement of said carrier means during rotation of said support means, cam-type actuator means for effecting inward radial movement of said carrier means, and drive means for movably controlling said actuator means, comprising the improvement wherein said support means includes an elongated sleevelike support structure positioned concentric to said axis and rotatable thereabout, said carrier means with said cutting element mounted thereon being radially movably supported on said support structure adjacent one axial end thereof, said cam-type actuator means including a slide ring externally surrounding said sleevelike support structure and being nonrotatably coupled thereto, said slide ring being axially slidably supported on said sleevelike structure and having cam means mounted thereon and positioned for engaging and radially displacing said carrier means in response to axial displacement of said slide ring, said slide ring being disposed more closely adjacent the other axial end of said sleevelike support structure, said drive means including a nonrotatable thrust ring disposed in axial bearing engagement with said slide ring for permitting relative rotation therebetween, said thrust ring being axially slidably supported relative to said axis, said drive means also including fluid pressure cylinder means drivingly interconnected to said thrust ring for effecting axial displacement thereof to also cause a corresponding axial displacement of the rotatable slide ring so that said cam means effects radial inward displacement of said carrier means and said cutting element during the rotation of said cutting head assembly, said fluid pressure cylinder means being coaxially aligned with said axis and positioned adjacent but axially spaced from the other axial end of said sleevelike support structure, said tubular guide extending coaxially through said fluid pressure cylinder means and through the piston rod means thereof which projects axially from one end of said fluid pressure cylinder means, said piston rod means being rigidly interconnected to said thrust ring.

8. In an apparatus for cutting a tubular element, said apparatus having a frame, an elongated tubular guide for stationarily supporting the tubular element, and a rotatable cutting head assembly positioned in concentric and surrounding relationship to said tubular guide and rotatable about the axis thereof for permitting cutting of said tubular element, said cutting head assembly including rotatable support means having carrier means movably mounted thereon for radial movement toward and away from the tubular element, said cutting head assembly also including a cutting element mounted on said carrier means for effecting cutting of the tubular element upon radial inward movement of said carrier means during rotation of said support means, cam-type actuator means for effecting inward radial movement of said carrier means, and drive means for movably controlling said actuator means, comprising the improvement wherein said support means includes an elongated sleevelike support structure positioned concentric to said axis and rotatable thereabout, said carrier means with said cutting element mounted thereon being radially movably supported on said support structure adjacent one axial end thereof, said cam-type actuator means including a slide ring externally surrounding said sleevelike support structure and being nonrotatably coupled thereto, said slide ring being axially slidably supported on said sleevelike structure and having cam means mounted thereon and positioned for engaging and radially displacing said carrier means in response to axial displacement of said slide ring, said slide ring being disposed more closely adjacent the other axial end of said sleevelike support structure, said drive means including a nonrotatable thrust ring disposed in axial bearing engagement with said slide ring for permitting relative rotation therebetween, said thrust ring being axially slidably supported relative to said axis, said drive means also including fluid pressure cylinder means drivingly interconnected to said thrust ring for effecting axial displacement thereof to also cause a corresponding axial displacement of the rotatable slide ring so that said cam means effects radial inward displacement of said carrier means and said cutting element during the rotation of said cutting head assembly, said frame including a stationary mounting plate having said tubular guide projecting therethrough, said frame also including a sleevelike support spindle fixedly mounted on said mounting plate and projecting horizontally therefrom in a cantilevered relationship, said sleevelike support structure being rotatably supported on said support spindle and having said other axial end thereof positioned adjacent said mounting plate, and said fluid pressure cylinder means being coaxially aligned with said axis and disposed on the opposite axial side of said mounting plate from said support spindle, said cylinder means having the housing thereof fixedly secured to said mounting plate and having its piston rod means axially slidably projecting toward said sleevelike support structure and being rigidly interconnected to said thrust ring.

9. In an apparatus for cutting a tubular element, said apparatus having a frame, an elongated tubular guide for stationarily supporting the tubular element, and a rotatable cutting head assembly positioned in concentric and surrounding relationship to said tubular guide and rotatable about the axis thereof for permitting cutting of said tubular element, said cutting head assembly including rotatable support means having at least three angularly-spaced carrier means movably mounted thereon for radial movement toward and away from the tubular element, said cutting head assembly including a cutting element mounted on a first said carrier means for effecting cutting of the tubular element upon radial inward movement of said carrier means during rotation of said support means, said cutting head also including a roller mounted on each of the second and third said carrier means for engagement with the tubular element upon inward radial movement of said carrier means, cam-type actuator means for effecting inward radial movement of said carrier means, and drive means for movably controlling said actuator means, comprising the improvement wherein said support means includes an elongated sleevelike support structure positioned concentric to said axis and rotatable thereabout, said three carrier means being radially movably supported on said support structure adjacent one axial end thereof, said cam-type actuator means including a slide ring externally surrounding said sleevelike support structure and being nonrotatably coupled thereto, said slide ring being axially slidably supported on said sleevelike structure and having cam means mounted thereon and positioned for engaging and radially displacing said three carrier means in response to axial displacement of said slide ring, said slide ring being disposed more closely adjacent the other axial end of said sleevelike support structure, said drive means including a nonrotatable thrust ring disposed in axial bearing engagement with said slide ring for permitting relative rotation therebetween, said thrust ring being axially slidably supported relative to said axis, said drive means also including fluid pressure cylinder means drivingly interconnected to said thrust ring for effecting axial displacement thereof to also cause a corresponding axial displacement of the rotatable slide ring so that said cam means effects radial inward displacement of said carrier means and said cutting element and rollers during the rotation of said cutting head assembly, said cam means including at least three rollerlike cylindrical cams positioned for radially inwardly camming a respective one of said carrier means, each of said cams being fixedly connected to said slide ring by a similar element which extends axially between the respective cam and said slide ring, each of said cams having a camming surface defined by a conical external cam profile which extends over at least a portion of the axial length thereof, the cam profile on the cam which engages said first carrier means being different from the cam profile on the other cams.

* * * * *